United States Patent
Tamamura

(10) Patent No.: US 7,463,284 B2
(45) Date of Patent: Dec. 9, 2008

(54) IMAGE PROCESSING APPARATUS AND IMAGE PROCESSING METHOD FOR PRODUCING AN IMAGE FROM A PLURALITY OF IMAGES

(75) Inventor: Hideo Tamamura, Yokohama (JP)

(73) Assignee: Canon Kabushiki Kaisha (JP)

( * ) Notice: Subject to any disclaimer, the term of this patent is extended or adjusted under 35 U.S.C. 154(b) by 616 days.

(21) Appl. No.: 11/274,496

(22) Filed: Nov. 15, 2005

(65) Prior Publication Data

US 2006/0114331 A1    Jun. 1, 2006

(30) Foreign Application Priority Data

Nov. 15, 2004  (JP)  ............................. 2004-331111

(51) Int. Cl.
*H04N 5/228* (2006.01)
(52) U.S. Cl. .............................. 348/208.1; 348/208.13; 348/208.14; 348/169; 348/208.99; 348/208.4
(58) Field of Classification Search ... 348/208.1–208.6, 348/208.99, 169; 382/103
See application file for complete search history.

(56) References Cited

U.S. PATENT DOCUMENTS

| 6,784,927 | B1 * | 8/2004 | Itokawa .................... 348/208.1 |
| 7,095,001 | B2 * | 8/2006 | Kawahara ................. 250/201.2 |
| 7,187,786 | B2 * | 3/2007 | Kee ............................ 382/118 |

2007/0098381 A1   5/2007  Oshima

FOREIGN PATENT DOCUMENTS

| CN | 1833433 A | 9/2006 |
| EP | 1641246 A1 | 3/2006 |
| EP | 1703721 A1 | 9/2006 |
| JP | 9-261526 A | 10/1997 |
| JP | 2000-341577 A | 12/2000 |
| JP | 2005-33785 A | 2/2005 |
| WO | 2004-112380 A1 | 12/2004 |
| WO | 2005-064921 A1 | 7/2005 |

OTHER PUBLICATIONS

Machine translation of JP reference No. 9-261526.
Machine translation of JP reference No. 2005-33785.
Office Action issued in corresponding Chinese patent application No. 200510115329.3, dated Aug. 3, 2007.

* cited by examiner

*Primary Examiner*—David L Ometz
*Assistant Examiner*—Usman Khan
(74) *Attorney, Agent, or Firm*—Rossi, Kimms & McDowell LLP

(57) ABSTRACT

An image processing apparatus comprises a detection unit adapted to detect a positional shift of a main object in each of the images, a coordinate converting unit adapted to convert coordinates of each of the images using a detection result of the detection unit, and a correcting unit adapted to correct image exposure by combining the images after coordinate conversion. In combination of the images, images that have fewer positional shifts are selected and combined among images that have been sensed in a number larger than the number of images with correct exposure.

22 Claims, 9 Drawing Sheets

IMAGE PROCESSING APPARATUS AND IMAGE PROCESSING METHOD FOR PRODUCING AN IMAGE FROM A PLURALITY OF IMAGES

FIELD OF THE INVENTION

The present invention relates to an image processing apparatus and image processing method which combine a plurality of images.

BACKGROUND OF THE INVENTION

Vibration acting on a camera is one of factors that cause an image sensing failure. For example, according the system proposed in Japanese Patent Laid-Open No. 2000-341577, a camera shake state of the photographer is detected and a lens is accordingly moved to obtain an image free from vibration even when exposure lasts in a long shutter mode.

With the method described in Japanese Patent Laid-Open No. 2000-341577, if one correct exposure image is to be formed from a plurality of blurred images, the size (number of pixels) of the correct exposure image decreases undesirably in accordance with the magnitude of the vibration.

SUMMARY OF THE INVENTION

It is an object of the present invention to solve the above drawback.

According to the present invention, there is provided an image processing apparatus comprising a detection adapted to detect a positional shift of a main object in each of the images, a coordinate converting unit adapted to convert coordinates of each of the images using a detection result of the detection unit, and a correcting unit adapted to correct image exposure by combining the images after coordinate conversion, wherein in combination of the images, images that have fewer positional shifts are selected and combined among images that have been sensed in a number larger than the number of images with correct exposure.

According to the present invention, there is also provided an image processing apparatus comprising a detection unit adapted to detect a positional shift of a main object in each of the images, a coordinate converting unit adapted to convert coordinates of each of the images using a detection result of the detection unit, and a correcting unit adapted to correct image exposure by combining the images after coordinate conversion, wherein in combination of the images, images are combined by using images that are smaller in number than the sensed images such that a combined image has the largest region.

According to the present invention, there is also provided an image processing apparatus comprising a detection unit adapted to detect a positional shift of a main object in each of the images, a coordinate converting unit adapted to convert coordinates of each of the images using a detection result of the detection unit, a correcting unit adapted to correct image exposure by combining the images after coordinate conversion, and setting means for prioritizing the images to be combined, wherein the images are combined such that an image having the highest priority is combined with remaining ones of the images.

According to the present invention, there is also provided an image processing method comprising a detection step of detecting a positional shift of a main object in each of the images, a coordinate conversion step of converting coordinates of each of the images using a detection result of the detection step, and a correction step of correcting image exposure by combining the images after coordinate conversion, wherein in combination of the images, images that have fewer positional shifts are selected and combined among images that have been sensed in a number larger than the number of images with correct exposure.

According to the present invention, there is also provided an image processing method comprising a detection step of detecting a positional shift of a main object in each of the images, a coordinate conversion step of converting coordinates of each of the images using a detection result of the detection step, and a correction step of correcting image exposure by combining the images after coordinate conversion, wherein in combination of the images, images are combined by using images that are smaller in number than the sensed images such that a combined image has the largest region.

According to the present invention, there is also provided an image processing method comprising a detection step of detecting a positional shift of a main object in each of the images, a coordinate conversion step of converting coordinates of each of the images using a detection result of the detection step, a correction step of correcting image exposure by combining the images after coordinate conversion, and a setting step of prioritizing the images to be combined, wherein the images are combined such that an image having the highest priority is combined with remaining ones of the images.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The embodiments of the present invention will be described in detail with reference to the accompanying drawings. Note that the embodiments to be described hereinafter are merely examples of the present invention, and that the present invention is not limited to the following embodiments.

First Embodiment

Figure 1:
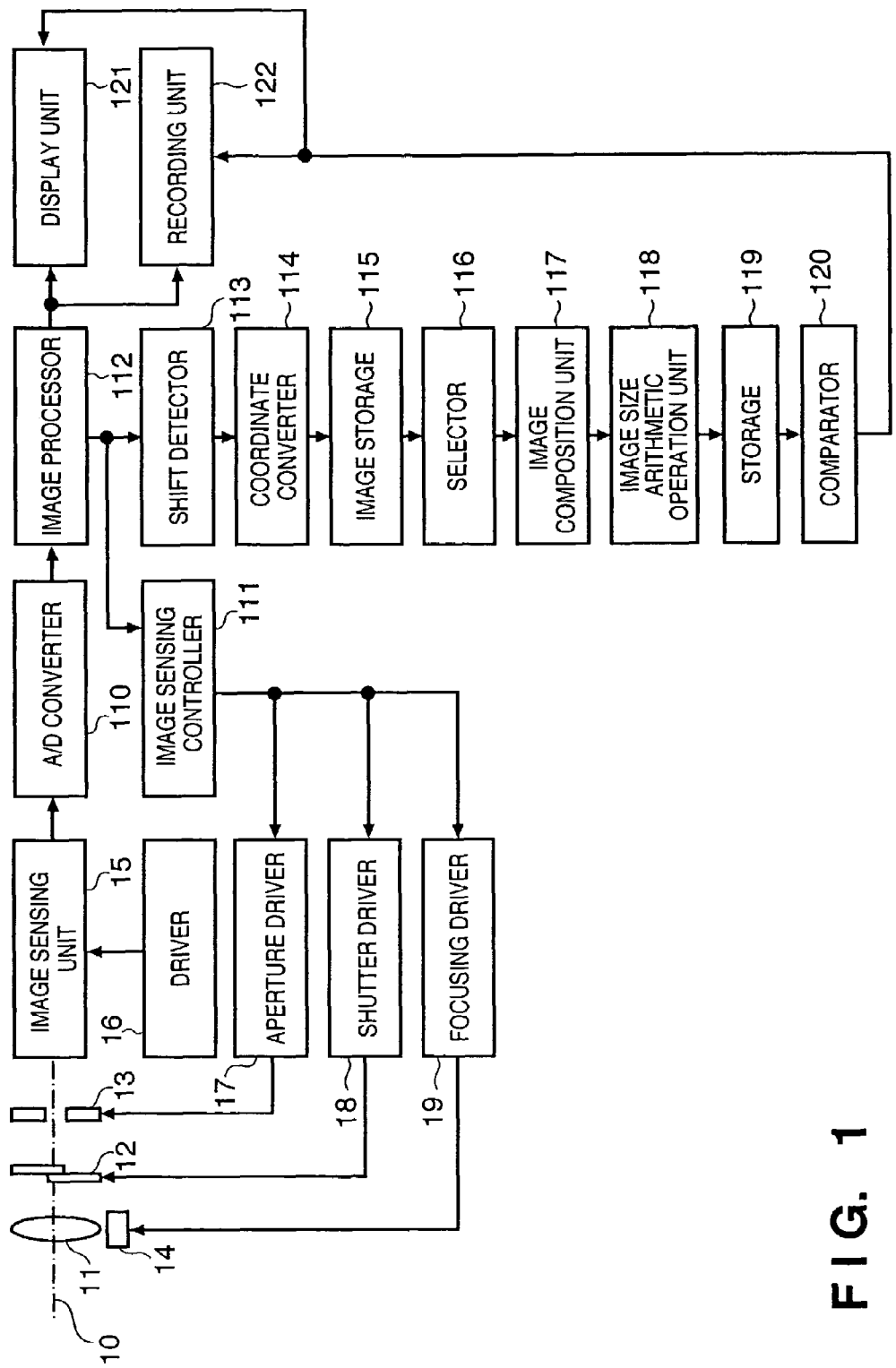
FIG. 1 is a block diagram of an image sensing apparatus according to the first embodiment of the present invention.

FIG. 1 is a block diagram of an image sensing apparatus according to the first embodiment of the present invention. An example of the image sensing apparatus includes a digital camera, a digital video camera, a cellular phone with a camera, and the like. Note that the image sensing apparatus according to this embodiment is a digital camera.

Referring to FIG. 1, a ray of light which enters the camera through a lens 11 passes through a shutter 12, is limited in quantity of light by an aperture 13, and forms an image on an image sensing unit 15.

The image sensing unit 15 senses an image by using an image sensor such as a CMOS image sensor or CCD sensor.

To bring the camera into focus, the lens 11 is moved along an optical axis 10 by an AF driving motor 14, thus adjusting the focus.

The AF driving motor 14 is driven by a focusing driver 19. The aperture diameter of the aperture 13 is determined by an aperture driver 17. The shutter 12 is opened/closed by a shutter driver 18 to control the ray of light which enters the image sensing unit 15.

The focusing driver 19, aperture driver 17, and shutter driver 18 are controlled by an image sensing controller 111.

The image sensing controller 111 performs photometry using an image loaded in an image processor 112 so as to determine the diameter of the aperture 13 and the open time of the shutter 12, or obtain the focal point by cooperation with the focusing driver 19.

An A/D converter 110 converts the image sensed by the image sensing unit 15 into a digital image.

The image processor 112 performs predetermined image processing by using the digital image from the A/D converter 110. The image processed by the image processor 112 is supplied to a display unit 121, recording unit 122, and shift detector 113.

The operation described above ordinarily takes place when an object having brightness that does not require anti-vibration is to be image-sensed. If the object to be image-sensed is dark and the shutter speed is long to likely cause camera shake, the photographer turns on an anti-vibration system at the operation unit of the digital camera to switch the camera to the following operation.

First, the photographer presses the release button of the digital camera halfway for image sensing preparation to perform focusing and photometry.

The shutter speed (exposure time) and the aperture diameter are set on the basis of the photometric value. In general, when the image sensing conditions require the use of the anti-vibration system, the object is dark, so that the aperture is fully open in a long shutter mode.

The exposure time is divided into a plurality of short exposure time periods and image sensing is repeated for the number of divisional time periods.

When the exposure time is divided into short exposure time periods in this manner, the respective images are underexposed, and they are blurred.

The plurality of images are combined after image sensing to form one image, thus improving the exposure.

When the plurality of images are sensed, even though each image is not blurred, the combinations of the respective images change slightly due to camera shake during continuous image sensing. If these images are combined directly, the combined image undesirably becomes a blurred image.

In view of this, the shift detector 113 determines the feature point of the image, and calculates the point coordinates on the screen of the feature point.

A coordinate converter 114 converts the coordinates of each image in accordance with changes in feature points obtained by the shift detector 113. An image storage 115 stores each image after coordinate conversion. The number of sensed images is larger than the number of images with correct exposure.

A selector 116 determines how to select images in accordance with the number of sensed images.

Figure 3:
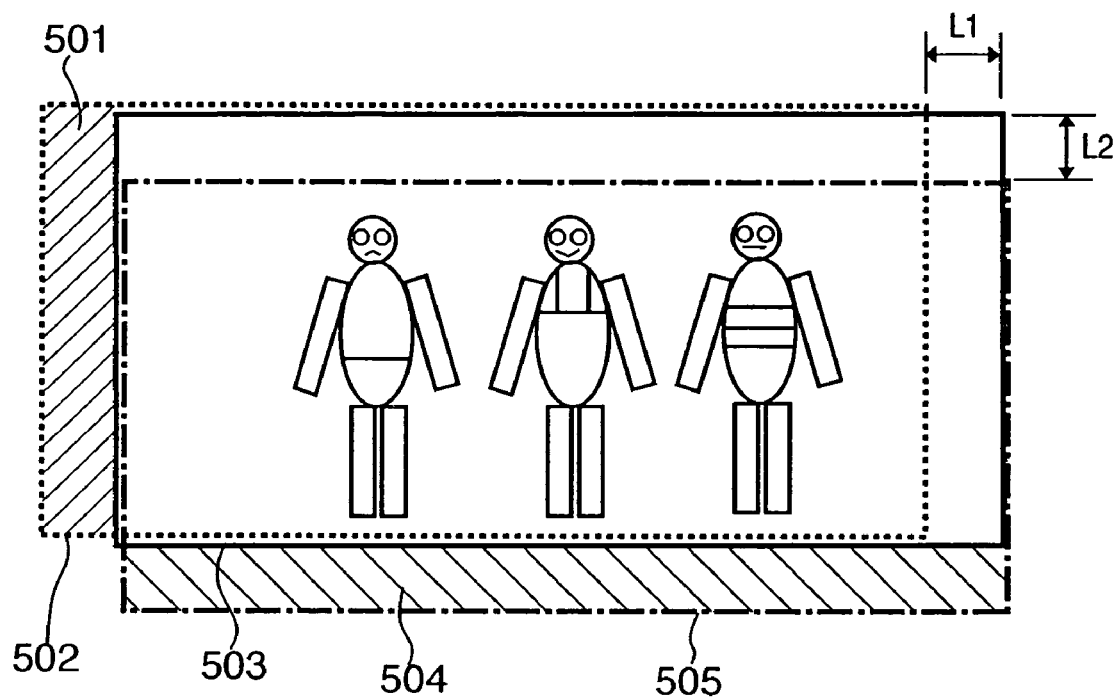
FIG. 3 is a view showing how sensed images are combined by the image processing according to the first embodiment of the present invention.

FIG. 3 shows an example in which three images are sensed for an object and correct exposure is obtained by combining two images.

Figure 4:
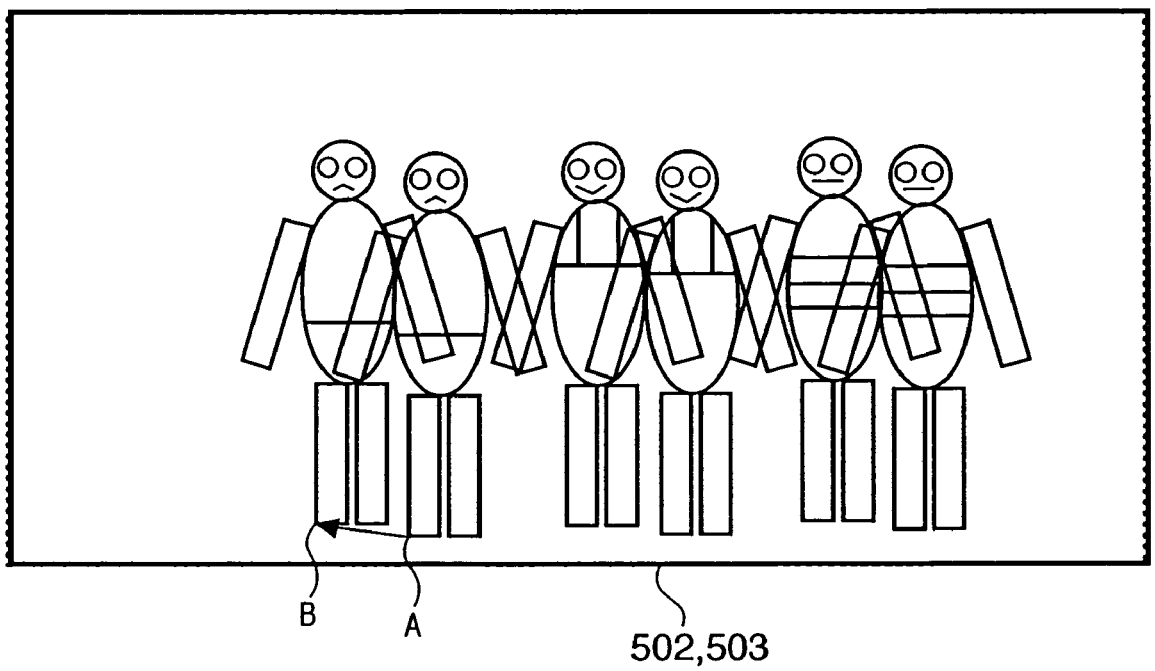
FIG. 4 is a view showing how blurred images are combined by the image processing according to the first embodiment of the present invention.

The image is slightly horizontally elongated for the descriptive convenience. Image-sensed areas 503, 502, and 505 are sensed images. As shown in FIG. 3, the three images are shifted from each other due to the camera shake. The selector 116 selects all image combinations of any two of the three images, i.e., 503 and 502, 502 and 505, and 505 and 503, and transfers the selected images to a next image combining unit 117. The image combining unit 117 combines the transferred three images in accordance with the combination method described above. FIG. 4 shows an image obtained by overlaying the image-sensed areas of the sensed images 502 and 503 of FIG. 3. In this case, as the images are blurred, the object images are blurred accordingly. When a portion A of the image 502 of the object is overlaid on a portion B of the image 503 of the object, the two objects overlap exactly.

Then, the sizes (numbers of pixels) of the combine images are calculated by an image size arithmetic operation unit 118 and compared by a comparator 120. A combined image that has the largest size (number of pixels) is sent to the recording unit 122 and display unit 121. Assume that the image 503 serves as a basic image in FIG. 3. In this case, the area of the overlaying portion of the images of the image-sensed areas 503 and 502 has an area obtained by subtracting the area of the hatched portion 501 because the image 502 is sensed with a shift by a distance L1 in the horizontal direction. The overlaying portion of the images of the image-sensed areas 503 and 505 has an area indicated by the alternate long and short dashed line because the area is shifted by a distance L2 in the vertical direction. If the distances L1 and L2 are almost equal to each other, a combined image having a larger area can be obtained when the overlaying portion with the image 502 shifted in the horizontal direction is selected rather than a case wherein the image 403 is overlaid on the image 505 shifted in the vertical direction. The images 501 and 504 have considerably different areas although the images 501 and 504 are shifted by the same distance. In fine, an image to be overlaid cannot be determined by only the shift amount of the image.

Exposure correction of even one underexposed digital image can be performed by increasing its gain. However, when the gain is increased, noise also increases to result in a poor-quality image.

When the overall gain is increased by combining images as in the scheme of the present invention, the noise components of the respective images are averaged to obtain a combined image having a high S/N ratio. As a consequence, the noise can be suppressed to obtain correct exposure.

In other words, a high-sensitivity image sensing unit is used as the image sensing unit 15 to sense a plurality of images while allowing noise. The plurality of images are added and averaged to reduce random noise contained in the images.

The combined image is displayed on the display unit 121 and recorded by the recording unit 122.

Figure 2:
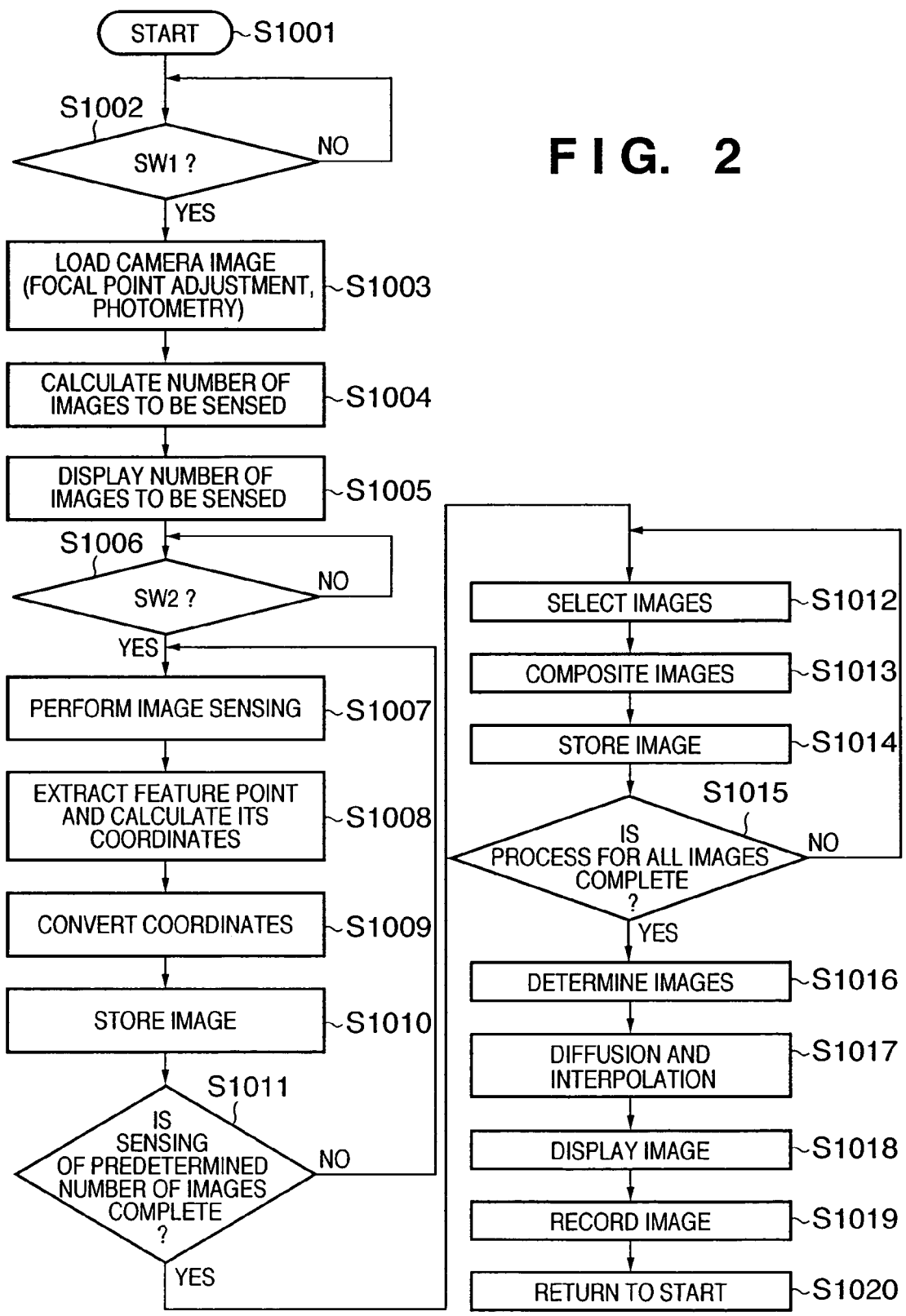
FIG. 2 is a flowchart showing image processing according to the first embodiment of the present invention.

FIG. 2 is a flowchart that summarizes the operation described above. The flowchart starts when an anti-vibration switch is turned on (step S1001).

In step S1002, the camera stands by until the photographer presses the release button halfway. When the release button is pressed halfway to turn on SW1, the flow advances to step S1003.

In step S1003, the image sensing unit 15 senses the image of the object. While the image processor 112 detects the contrast of the image, the image sensing controller 111 drives the AF driving motor 14 to move the lens 11 forward. The forward movement of the lens 11 is stopped at a position where the contrast is highest, thus performing focusing. Simultaneously, the brightness of the object is obtained from an output from the image sensing unit 15.

In step S1004, the number of images to be sensed is obtained from the brightness of the object obtained in step S1003.

For example, assume that to measure the brightness of the object by photometry and to expose the object with correct exposure, the aperture 13 must be fully open (e.g., f2.8) and the shutter 12 requires a shutter speed of ⅛.

At this time, if the calculated image sensing focal length for a 35-mm film is 30 mm, in image sensing at the shutter speed of ⅛, camera shake may occur. Thus, the shutter speed is set to 1/32 with which camera shake does not occur. The appropriate number of times of image sensing is four, to which an additional number of images is added. Image sensing is performed for the resultant number of images.

If the image sensing focal length is 300 mm, the shutter speed is set to 1/320 with which camera shake does not occur. The camera is set to perform image sensing 40 times plus an additional number of images.

In step S1005, the number of images to be sensed is displayed on the viewfinder or liquid crystal display of the camera to inform the photographer of it.

In step S1006, the camera stands by until the release button is pressed fully to input an image sensing instruction.

During this standby step, if the release button is pressed halfway to turn off SW1, the flow returns to the start.

In step S1007, image sensing for the first image is started.

In step S1008, the shift detector 113 extracts a feature image from the surrounding region of the first image, and calculates the coordinates of the feature image.

In step S1009, coordinate conversion is performed. In this case, coordinate conversion is not performed for the first image, and the flow directly advances to step S1010.

In step S1010, the image is stored in the image storage 115.

In step S1011, the process starting with step S1007 is repeated until a predetermined number of images are sensed and stored.

In step S1012, the images to be combined are selected. The selector 116 of FIG. 1 sequentially selects all image combinations, i.e., 503 and 502, 502 and 505, and 505 and 503.

In step S1013, the selected images are combined, and the combined result is stored (step S1014). In step S1015, the process starting with step S1012 is sequentially performed. When all the images are processed, in step S1016, which images are to be selected is determined. In this case, the sizes of images formed by combination are compared, and a combined image having the largest size is selected. The selected image is subjected to diffusion interpolation in step S1017 to restore it to an image having a size as true as possible to the original size. In the next step S1018, the interpolated image is displayed on the liquid crystal display or the like on the rear surface of the camera. In step S1019, the interpolated image is recorded on a detachable recording medium such as a semiconductor memory. After that, in step S1020, the flow returns to the start.

Second Embodiment

Figure 5:
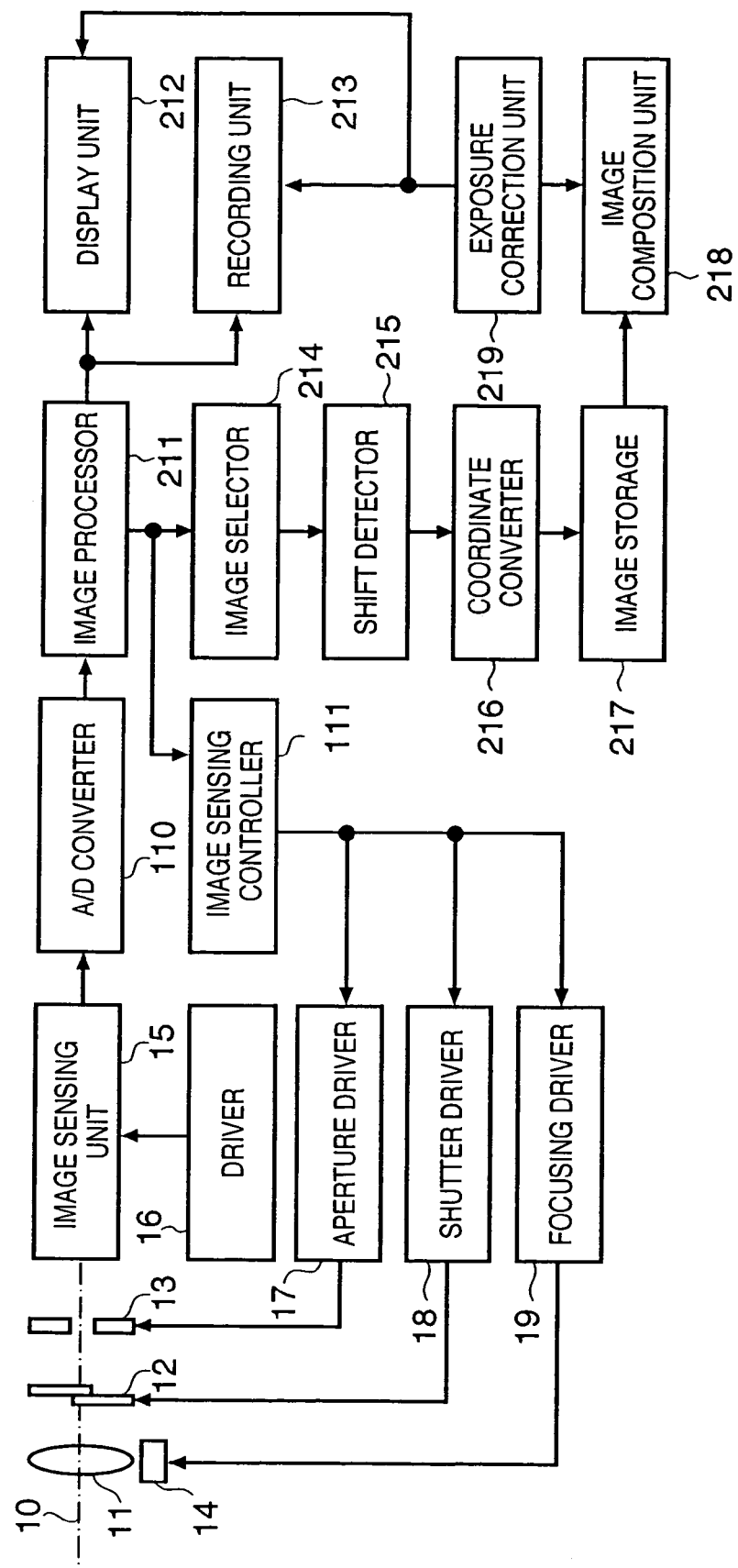
FIG. 5 is a block diagram of an image sensing apparatus according to the second embodiment of the present invention.

FIG. 5 is a block diagram of an image sensing apparatus according to the second embodiment of the present invention.

Referring to FIG. 5, a ray of light which enters the camera through a lens 11 passes through a shutter 12, is limited in quantity of light by an aperture 13, and forms an image on an image sensing unit 15.

The image sensing unit 15 senses an image by using an image sensor such as a CMOS image sensor or CCD sensor.

To bring the camera into focus, the lens 11 is moved along an optical axis 10 by an AF driving motor 14, thus adjusting the focus.

The AF driving motor 14 is driven by a focusing driver 19. The aperture diameter of the aperture 13 is determined by an aperture driver 17. The shutter 12 is opened/closed by a shutter driver 18 to control the ray of light which enters the image sensing unit 15.

The focusing driver 19, aperture driver 17, and shutter driver 18 are controlled by an image sensing controller 111.

The image sensing controller 111 performs photometry using an image loaded in an image processor 211 so as to determine the diameter of the aperture 13 and the shutter speed of the shutter 12, or obtain the focal point by cooperation with the focusing driver 19.

An A/D converter 110 converts the image sensed by the image sensing unit 15 into a digital image.

The image processor 211 performs predetermined image processing by using the digital image from the A/D converter 110. The image processed by the image processor 211 is supplied to a display unit 212, recording unit 213, and image selector 214.

The operation described above ordinarily takes place when an object having brightness that does not require anti-vibration is to be image-sensed. If the object to be image-sensed is dark and the shutter speed is long to likely cause camera shake, the photographer turns on an anti-vibration system at the operation unit of the digital camera to switch the camera to the following operation.

First, the photographer presses the release button of the digital camera halfway for image sensing preparation to perform focusing and photometry.

The shutter speed (exposure time) and the aperture diameter are set on the basis of the photometric value. In general, when the image sensing conditions require the use of the anti-vibration system, the object is dark, so that the aperture is fully open in a long shutter mode.

The exposure time is divided into a plurality of short exposure time periods and image sensing is repeated for the number of divisional time periods.

When the exposure time is divided into short exposure time periods in this manner, the respective images are underexposed, but they are less blurred.

The plurality of images are combined after image sensing to form one image, thus improving the exposure.

When the plurality of images are sensed, even though each image is not blurred, the combinations of the respective images change slightly due to camera shake during continuous image sensing. If these images are combined directly, the combined image undesirably becomes a blurred image.

In view of this, the image selector 214 determines how to select images in accordance with the number of sensed images.

Figure 7:
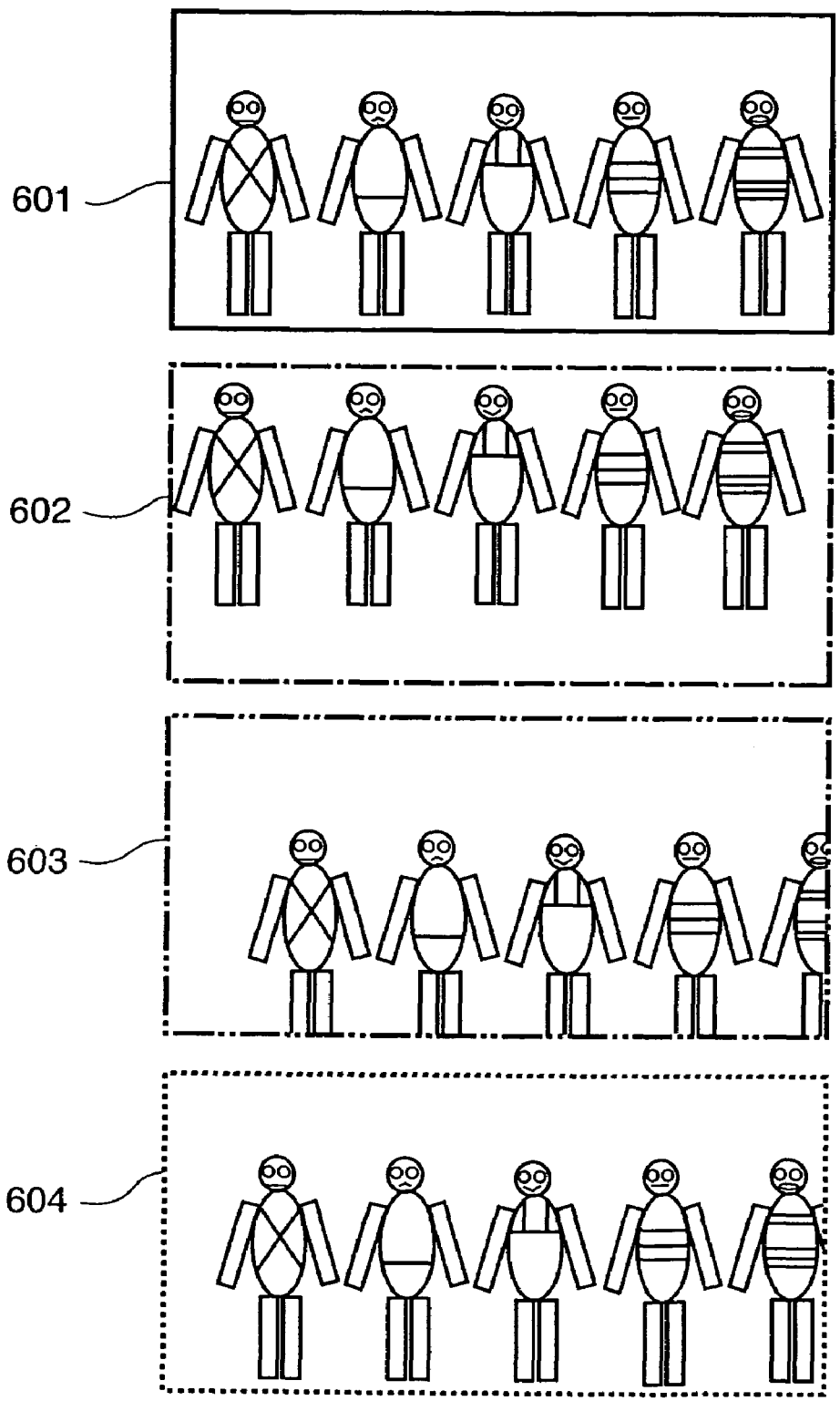
FIG. 7 is a view showing how sensed images are combined by the image processing according to the second embodiment of the present invention.

FIG. 7 shows an example in which four images are sensed for an object and correct exposure is obtained by combining three images.

Figure 9:
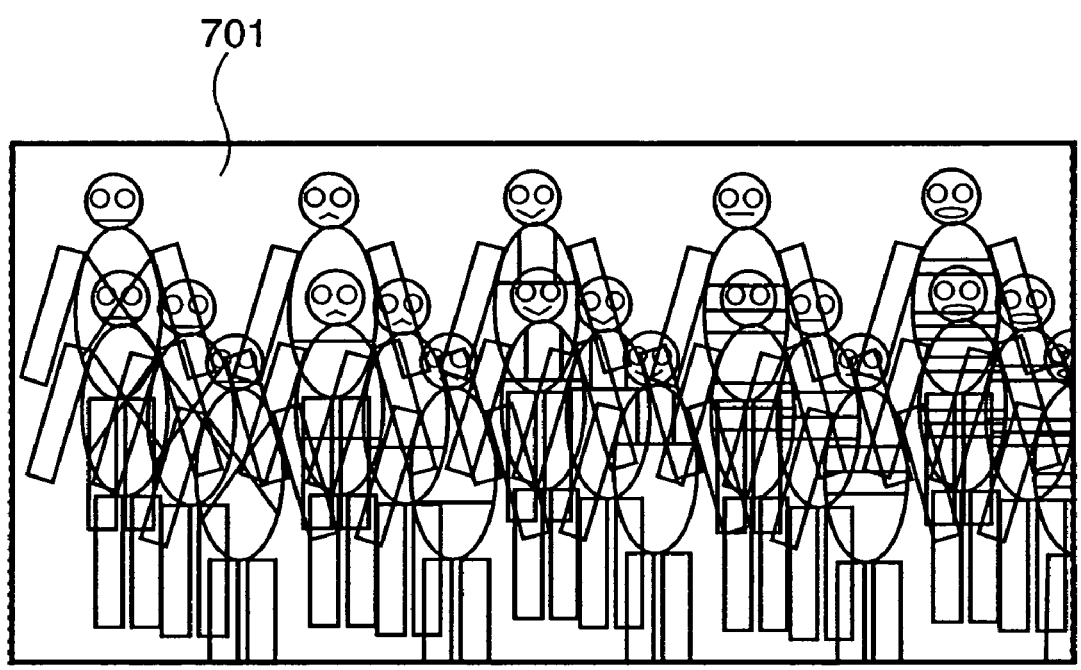
FIG. 9 is a view showing how blurred images are combined by the image processing according to the second embodiment of the present invention.

The sensed images are represented by 601 to 604. When the field angles of the four images are overlaid, they form a blurred image as shown in FIG. 9.

The image selector 214 selects the image 601 to determine it as a reference image, and the display range of the field angle of the image 601 serves as the range of the final combined image. Then, the images 602 and 604 are selected. Three images which form a combined portion with correct exposure are thus specified. The selected images 602 and 604 are specified and input at the operation unit while observing the images of FIG. 7 displayed on the liquid crystal display or the like mounted on the rear surface of the digital camera according to this embodiment.

Then, a shift detector 215 determines the feature point of the image signal, and calculates the point coordinates on the screen of the feature point. A coordinate converter 216 converts the coordinates of each image in accordance with a change in feature point obtained by the shift detector 215.

An image storage 217 stores each image after coordinate conversion.

Figure 8:
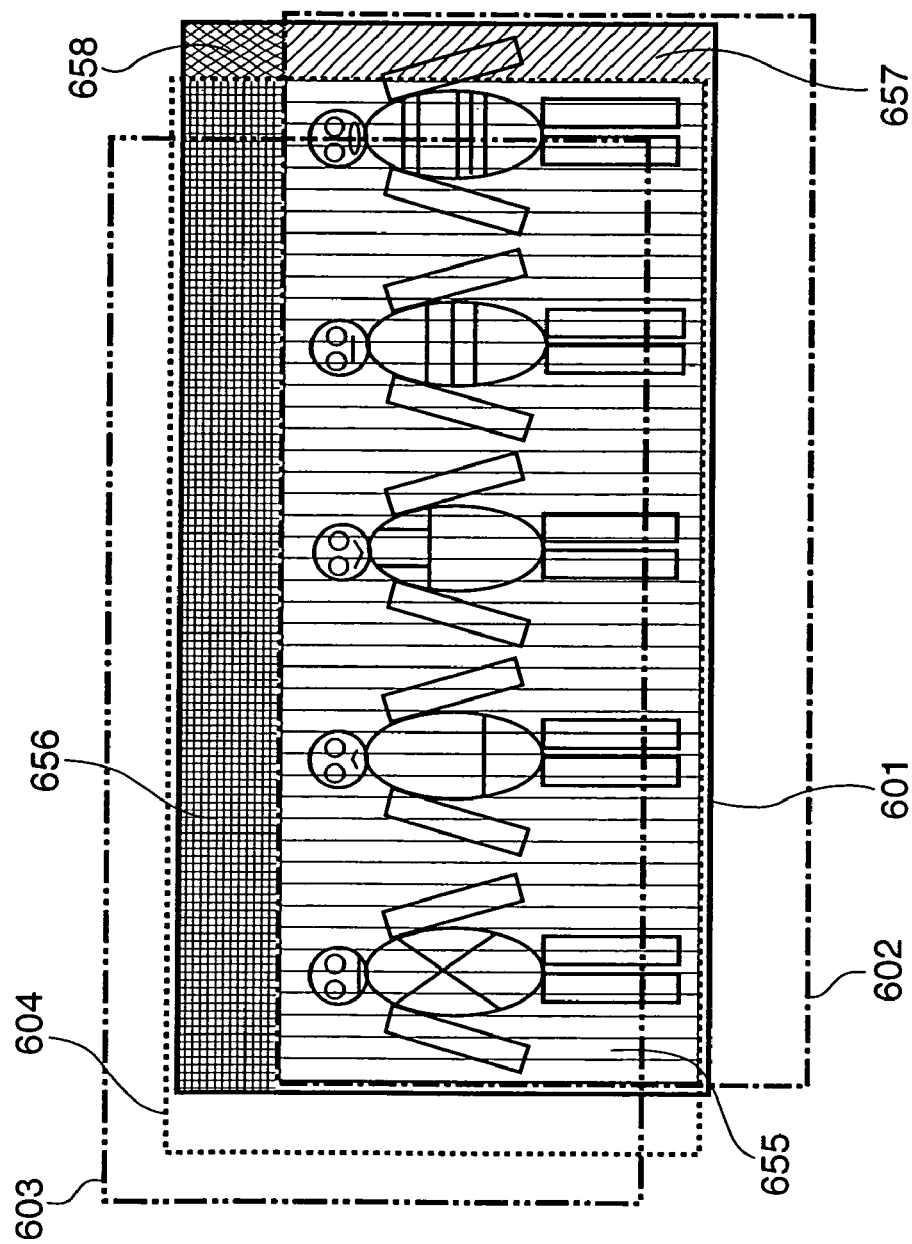
FIG. 8 is a view showing how the sensed images are combined by the image processing according to the second embodiment of the present invention.

The selected images are transferred to an image combining unit 218. The image combining unit 218 combines the transferred three images in accordance with the combination method described above. FIG. 8 shows an image obtained by combination such that the resultant object image is not blurred.

In FIG. 8, a vertical lined portion 655 is a portion where the three combined portions overlap. As the three images are combined, the exposure becomes correct. A hatched portion 657 is a portion having no information on the image 604 among the three images. Without this image, the left arm of the rightmost person is not displayed. As this portion has the number of images smaller by one, it is underexposed. Thus, this portion is corrected to be overexposed. A plaid portion 656 has no information on the image 602. The exposure of this portion is also corrected because this portion has the number of images smaller by one. A cross-hatched portion 658 has no information on the images 604 and 602. Hence, this portion requires exposure correction corresponding to two images. When exposure correction is performed, the resultant image contains necessary images, although the image quality degrades slightly. The portion that requires exposure correction is mostly located on the end portion of the image and accordingly the resultant image substantially poses no problem in practice. The image corrected by an exposure correction unit 219 is displayed on the display unit 212 and simultaneously recorded by the recording unit 213.

Figure 6:
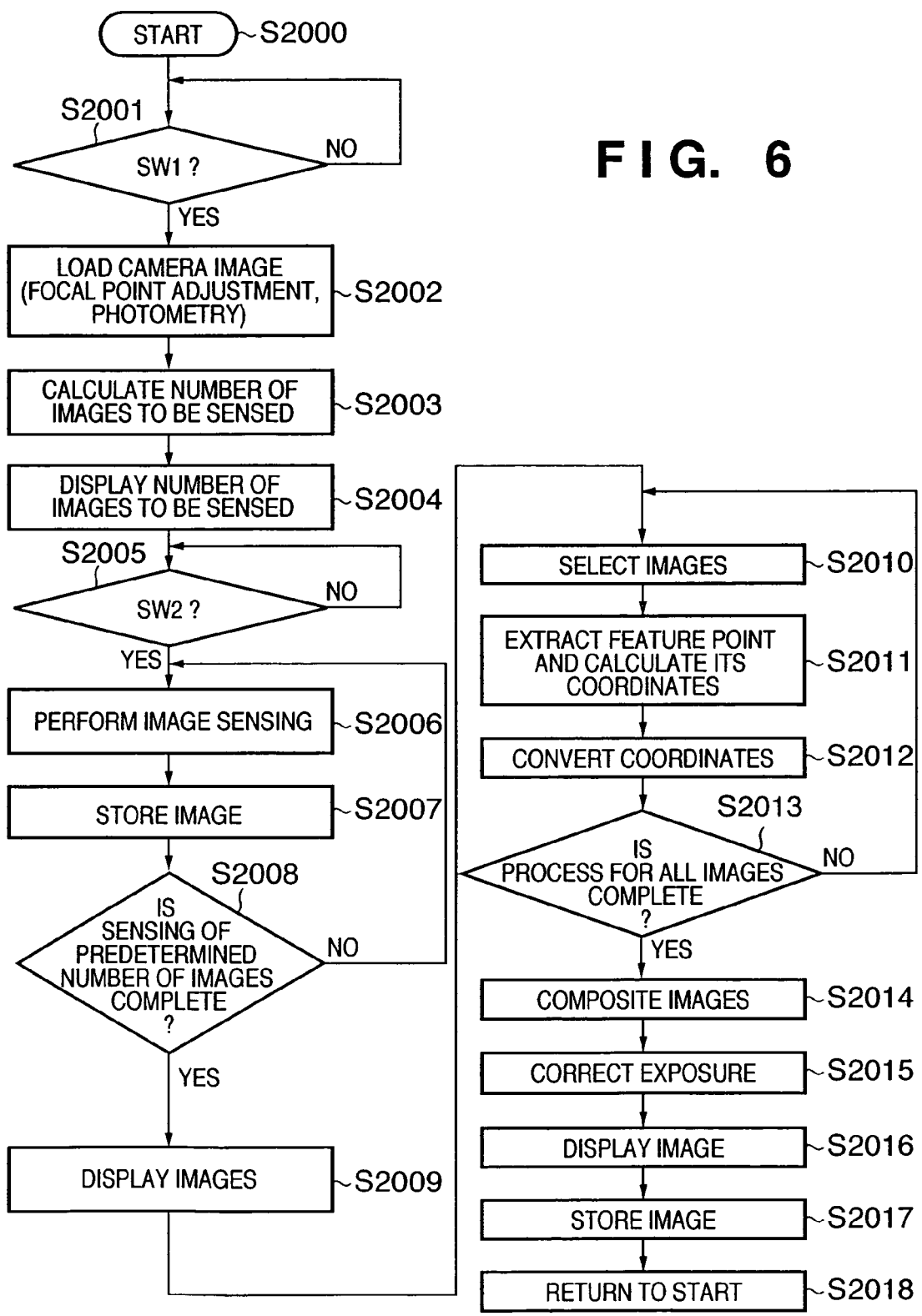
FIG. 6 is a flowchart showing image processing according to the second embodiment of the present invention.

FIG. 6 is a flowchart that summarizes the operation described above. The flowchart starts when an anti-vibration switch is turned on (step S2000).

In step S2001, the camera stands by until the photographer presses the release button halfway. When the release button is pressed halfway to turn on SW1, the flow advances to step S2002.

In step S2002, the image sensing unit 15 senses the image of the object. While the image processor 211 detects the contrast of the image, the image sensing controller 111 drives the AF driving motor 14 to move the lens 11 forward. The forward movement of the lens 11 is stopped at a position where the contrast is highest, thus performing focusing. Simultaneously, the brightness of the object is obtained from an output from the image sensing unit 15.

In step S2003, the number of images to be sensed is obtained from the brightness of the object obtained in step S2002.

For example, assume that to measure the brightness of the object by photometry and to expose the object with correct exposure, the aperture 13 must be fully open (e.g., f2.8) and the shutter 12 requires a shutter speed of ⅛.

At this time, if the calculated image sensing focal length for a 35-mm film is 30 mm, in image sensing at the shutter speed of ⅛, camera shake may occur. Thus, the shutter speed is set to 1/32 with which camera shake does not occur. The appropriate number of times of image sensing is four, to which an additional number of images is added. Image sensing is performed for the resultant number of images.

If the image sensing focal length is 300 mm, the shutter speed is set to 1/320 with which camera shake does not occur. The camera is set to perform image sensing 40 times plus an additional number of images.

In step S2004, the number of images to be sensed is displayed on the viewfinder or liquid crystal display of the camera to inform the photographer of it.

In step S2005, the camera stands by until the release button is pressed fully to input an image sensing instruction.

During this standby step, if the release button is pressed halfway to turn off SW1, the flow returns to the start.

In step S2006, image sensing for the first image is started.

In step S2007, the images sensed in step S2006 are stored.

In step S2008, processing from steps S2006 to S2008 is repeated until image sensing for a predetermined number of images (i.e., the number of images determined in step S2003) is complete. When image sensing for all the images is complete, the flow advances to step S2009.

In step S2009, all the images stored in step S2007 are displayed.

In step S2010, images to be combined are selected from the images displayed in step S2010. First, a basic image is selected. The size (number of pixels) of this image serves as the size (number of pixels) to be displayed and recorded.

In step S2011, a feature point is extracted, and the coordinates of the feature point are calculated.

In step S2012, coordinate conversion is performed. In this case, coordinate conversion is not performed for the first image, and the flow directly advances to step S2013.

In step S2013, the process starting with step S2010 is repeated until a predetermined number of selected images are calculated.

In step 2010, the next image is selected. The corresponding feature point of the selected image is extracted, and its coordinates are calculated. This image is combined with the first image. All the images are combined in step S2014. A portion which is formed by combining a smaller number of images as described above is subjected to exposure correction in step S2015.

In the next step S2016, the combined image is displayed on the liquid crystal display or the like on the rear surface of the camera. In step S2017, the combined image is recorded on a detachable recording medium such as a semiconductor memory. In step S2018, the flow returns to the start.

According to this embodiment, to combine images, images are selected with priorities from a larger number of images than the predetermined number of images (the number of images with correct exposure). In selection with priorities, the method with which a remaining image is combined with the highest-priority image also naturally applies to the structure of creation of a combined image by image sensing with only the predetermined number of images with correct exposure.

The above embodiment is based on the fact that underexposure can be complemented by repeating image sensing a plurality of number of times within a short shutter speed with which the camera shake does not occur and by combining the plurality of sensed images. When coordinate conversion of each image is performed before the combination and a change in combination of each image caused by camera shake is corrected, blurring can be eliminated from the combined image.

In the above embodiments, image combination is performed in the image sensing apparatus, and the combined image is recorded on a recording medium and displayed on the liquid crystal display or the like on the rear surface of the camera. Alternatively, the image sensing apparatus may only sense images. After a plurality of sensed images are captured in an image processing device such as a personal computer, combination processing as described above may be performed. Such arrangement can also be naturally incorporated in the present invention. In other words, the present invention is not limited to an image sensing apparatus such as a digital camera, a digital video camera, a cellular phone with a camera, or the like, but can also be applied to an image processing device such as a personal computer.

Other Embodiment

The embodiments described above can be achieved when a computer-readable recording medium (or storage medium), on which software comprising program codes to realize the function of the embodiments described above is recorded, is supplied to a system or an apparatus and a computer (or a CPU or MPU) in the system or apparatus reads and executes the program codes stored in the recording medium. In this case, the program codes themselves which are read from the recording medium realize the function of the embodiments described above, and the recording medium that records the program codes constitute the present invention. When the computer executes the readout program codes, not only the function of the embodiments described above may be realized. Moreover, in response to the instruction of the program codes, the operating system (OS) or the like that runs on the computer may perform the actual process partly or entirely, to realize the function of the embodiments described above. Such case is also naturally incorporated in the present invention.

Alternatively, the program codes read from the recording medium may be written on a memory provided to a function expansion card inserted in the computer or a function expansion unit connected to the computer. After that, in response to the instruction of the program codes, the CPU or the like provided to the function expansion card or function expansion unit may perform the actual process partly or entirely, to realize the function of the embodiments described above. Such case is also naturally incorporated in the present invention.

When this embodiment is to be applied to the recording medium described above, the recording medium stores program codes corresponding to the flowchart described above.

This embodiment may also be applied to either a system comprising a plurality of devices (e.g., a host computer, interface device, reader, printer, and the like) or an apparatus which comprises one device (e.g., a copying machine or facsimile apparatus).

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-331111 filed on Nov. 15, 2004, which is hereby incorporated by reference herein.

What is claimed is:

1. An image processing apparatus for processing a plurality of images, comprising:
a detection unit adapted to detect a positional shift of a main object in each of the images;
a coordinate converting unit adapted to convert coordinates of each of the images using a detection result of said detection unit; and
a correcting unit adapted to correct image exposure by combining the images after coordinate conversion,
wherein in combination of the images, images that have fewer positional shifts are selected among images that have been sensed in a number larger than the number of images with correct exposure and the selected images is combined.

2. An image processing apparatus for processing a plurality of images, comprising:
a detection unit adapted to detect a positional shift of a main object in each of the images;
a coordinate converting unit adapted to convert coordinates of each of the images using a detection result of said detection unit; and
a correcting unit adapted to correct image exposure by combining the images after coordinate conversion,
wherein in combination of the images, images are combined by using images that are smaller in number than the sensed images such that a combined image has the largest region.

3. An image processing apparatus for processing a plurality of images, comprising:
a detection unit adapted to detect a positional shift of a main object in each of the images;
a coordinate converting unit adapted to convert coordinates of each of the images using a detection result of said detection unit;
a correcting unit adapted to correct image exposure by combining the images after coordinate conversion; and
a setting unit adapted to prioritize the images to be combined,
wherein the images are combined such that an image having the highest priority is combined with remaining ones of the images.

4. The apparatus according to claim 3, wherein said correcting unit corrects exposure of a portion of a filed angle of the image having the highest priority where no other image overlaps.

5. The apparatus according to claim 3, wherein the image having the highest priority is an image which is sensed first.

6. The apparatus according to claim 1, further comprising image sensing unit adapted to sense an image of an object by an image sensor.

7. The apparatus according to claim 2, further comprising image sensing unit adapted to sense an image of an object by an image sensor.

8. The apparatus according to claim 3, further comprising image sensing unit adapted to sense an image of an object by an image sensor.

9. The apparatus according to claim 1, wherein said image processing apparatus corrects an image received from an image sensing apparatus which senses an image of an object by an image sensor.

10. The apparatus according to claim 2, wherein said image processing apparatus corrects an image received from an image sensing apparatus which senses an image of an object by an image sensor.

11. The apparatus according to claim 3, wherein said image processing apparatus corrects an image received from an image sensing apparatus which senses an image of an object by an image sensor.

12. An image processing method of processing a plurality of images, comprising:
- a detection step of detecting a positional shift of a main object in each of the images;
- a coordinate conversion step of converting coordinates of each of the images using a detection result of the detection step; and
- a correction step of correcting image exposure by combining the images after coordinate conversion,
- wherein in combination of the images, images that have fewer positional shifts are selected among images that have been sensed in a number larger than the number of images with correct exposure and the selected images are combined.

13. An image processing method of processing a plurality of images, comprising:
- a detection step of detecting a positional shift of a main object in each of the images;
- a coordinate conversion step of converting coordinates of each of the images using a detection result of the detection step; and
- a correction step of correcting image exposure by combining the images after coordinate conversion,
- wherein in combination of the images, images are combined by using images that are smaller in number than the sensed images such that a combined image has the largest region.

14. An image processing method of processing a plurality of images, comprising:
- a detection step of detecting a positional shift of a main object in each of the images;
- a coordinate conversion step of converting coordinates of each of the images using a detection result of the detection step;
- a correction step of correcting image exposure by combining the images after coordinate conversion; and
- a setting step of prioritizing the images to be combined,
- wherein the images are combined such that an image having the highest priority is combined with remaining ones of the images.

15. The method according to claim 14, wherein in the correction step, exposure of a portion of a field angle of the image having the highest priority where no other image overlaps is corrected.

16. The method according to claim 14, wherein the image having the highest priority is an image which is sensed first.

17. The method according to claim 12, further comprising an image sensing step of sensing an image of an object by an image sensor.

18. The method according to claim 13, further comprising an image sensing step of sensing an image of an object by an image sensor.

19. The method according to claim 14, further comprising an image sensing step of sensing an image of an object by an image sensor.

20. The method according to claim 12, wherein in the correction step, an image received from an image sensing apparatus which senses an image of an object by an image sensor is corrected.

21. The method according to claim 13, wherein in the correction step, an image received from an image sensing apparatus which senses an image of an object by an image sensor is corrected.

22. The method according to claim 14, wherein in the correction step, an image received from an image sensing apparatus which senses an image of an object by an image sensor is corrected.

* * * * *